United States Patent
Winkler

(10) Patent No.: US 6,675,080 B2
(45) Date of Patent: Jan. 6, 2004

(54) HARDWARE INDEPENDENT MAPPING OF MULTIPLE SENSOR CONFIGURATIONS FOR CLASSIFICATION OF PERSONS

(75) Inventor: Gard Winkler, Regensburg (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 10/318,925

(22) Filed: Dec. 13, 2002

(65) Prior Publication Data

US 2003/0105571 A1 Jun. 5, 2003

Related U.S. Application Data

(62) Division of application No. 09/898,575, filed on Jul. 3, 2001
(60) Provisional application No. 60/217,581, filed on Jul. 12, 2001, provisional application No. 60/265,533, filed on Jan. 31, 2000, and provisional application No. 60/280,021, filed on Mar. 30, 2001.

(51) Int. Cl.⁷ .......................... B60R 21/22; B60R 21/32
(52) U.S. Cl. ....................... 701/45; 280/735; 280/734; 180/273
(58) Field of Search .................... 701/45, 36; 280/735, 280/734, 730.1, 732, 731, 728.1, 739, 736; 180/273, 268, 282

(56) References Cited

U.S. PATENT DOCUMENTS

| | | | |
|---|---|---|---|
| 5,232,243 A | 8/1993 | Blackburn | |
| 5,413,378 A | 5/1995 | Steffens | |
| 5,454,591 A | 10/1995 | Mazur | |
| 5,474,327 A | 12/1995 | Schousek | |
| 5,570,903 A | 11/1996 | Meister | |
| 5,605,348 A | 2/1997 | Blackburn | |
| 5,618,056 A | 4/1997 | Schoos | |
| 5,624,132 A | 4/1997 | Blackburn | |
| 5,626,359 A | 5/1997 | Steffens | |
| 5,670,853 A | 9/1997 | Bauer | |
| 5,678,854 A | 10/1997 | Meister | |
| 5,732,375 A | 3/1998 | Cashler | |
| 5,810,392 A | * | 9/1998 | Gagnon ...................... 180/268 |

(List continued on next page.)

FOREIGN PATENT DOCUMENTS

| | | |
|---|---|---|
| DE | 197 52976 | 6/1998 |
| DE | 197 22163 | 4/1999 |
| DE | 19945645 A1 | 4/2000 |
| FR | 2744548 A1 | 8/1997 |
| WO | WO 98/17508 | 4/1998 |
| WO | WO 98/58821 | 12/1998 |
| WO | WO 99/38731 A1 | 8/1999 |

OTHER PUBLICATIONS

Article: "Occupant Classification System for Smart Restraint Systems", SAE 1999-01-0761, K. Billen, Jan. 1999.*

* cited by examiner

Primary Examiner—William A. Cuchlinski, Jr.
Assistant Examiner—Olga Hernandez

(57) ABSTRACT

Sensors are mounted within a seat structure for measuring seat occupant weight. The sensors can be mounted in any one of various sensor configurations. So that common hardware can be used for each different sensor configuration, a virtual matrix is created and output from the sensors is mapped into the virtual matrix. The virtual matrix includes virtual cell locations that do not have a corresponding sensor output; i.e., there are fewer physical cells (sensors) than virtual cell locations in the virtual matrix. A weight output signal from each sensor is mapped into the corresponding position in the virtual matrix and the remaining virtual cell locations have values assigned to them based on data supplied by the surrounding physical cells. Seat occupant weight is determined based on output from the virtual matrix and the occupant is placed into one of the various occupant classifications. Deployment force of a restraint system is controlled based on the classification of the seat occupant.

26 Claims, 2 Drawing Sheets

U.S. PATENT DOCUMENTS

| | | |
|---|---|---|
| 5,821,633 A | 10/1998 | Burke |
| 5,865,463 A * | 2/1999 | Gagnon et al. .......... 280/730.2 |
| 5,906,393 A | 5/1999 | Mazur |
| 5,971,432 A * | 10/1999 | Gagnon et al. ............. 180/268 |
| 5,991,676 A * | 11/1999 | Podoloff et al. ............ 177/144 |
| 6,015,163 A | 1/2000 | Langford |
| 6,039,344 A | 3/2000 | Mehney |
| 6,070,115 A | 5/2000 | Oestreicher |
| 6,158,768 A * | 12/2000 | Steffens et al. ............. 180/237 |
| 6,345,839 B1 * | 2/2002 | Kuboki et al. .............. 280/735 |

* cited by examiner

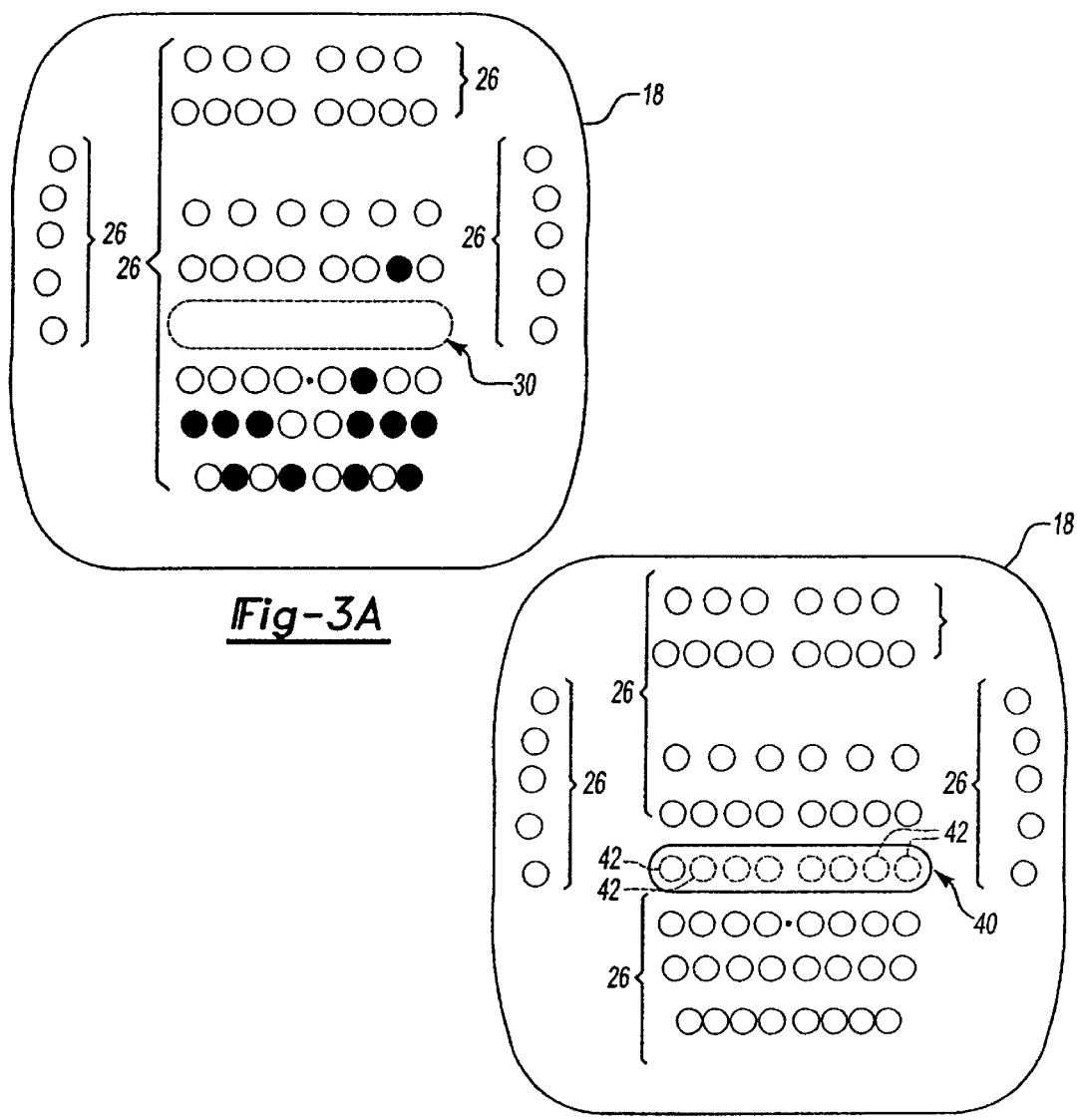
Fig-3A
Fig-3B
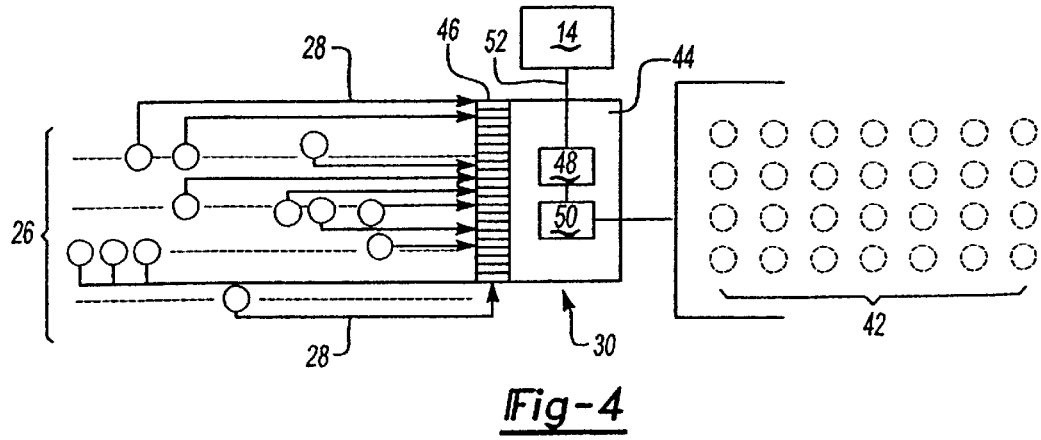
Fig-4

HARDWARE INDEPENDENT MAPPING OF MULTIPLE SENSOR CONFIGURATIONS FOR CLASSIFICATION OF PERSONS

RELATED APPLICATIONS

This application is a divisional of Ser. No. 09/898,575 filed on Jul. 3, 2001, which claims priority to provisional applications Ser. No. 60/217,581 filed on Jul. 12, 2000, Ser. No. 60/265,533 filed on Jan. 31, 2001, and Ser. No. 60/280,021 filed on Mar. 30, 2001.

BACKGROUND OF THE INVENTION

1. Field of the Invention

This invention relates to a method and apparatus for classifying vehicle occupants utilizing common hardware for multiple seat sensor configurations. Specifically, physical sensors are mapped into a virtual matrix from which an occupant classification is determined.

2. Related Art

Most vehicles include airbags and seatbelt restraint systems that work together to protect the driver and passengers from experiencing serious injuries due to high-speed collisions. It is important to control the deployment force of the airbags based on the size of the driver or the passenger. When an adult is seated on the vehicle seat, the airbag should be deployed in a normal manner. If there is a small child sitting on the vehicle seat, then the airbag should not be deployed or should be deployed at a significantly lower deployment force. One way to control the airbag deployment is to monitor the weight of the seat occupant. The weight information can be used to classify seat occupants into various groups, e.g., adult, child, infant seat, etc., to ultimately control the deployment force of the airbag.

There are many different systems for measuring the weight of a seat occupant. One type of system uses a plurality of sensors mounted within the seat bottom cushion. Information from the sensors is sent to system hardware, which utilizes software to combine the output from the sensors to determine the weight of the seat occupant. Often, these sensors must be placed symmetrically within the seat cushion in order to be compatible with the system hardware and software. Sometimes, due to specific seat design or limited space within the seat cushion, symmetrical placement of the sensors is difficult to achieve.

Another problem with current seat sensor configurations is that each different sensor configuration requires different system hardware and software to account for the variations in sensor placement. Thus, it is difficult to optimize sensor placement because of restrictions with regard to row and column placement of the sensors.

Thus, it is desirable to have a method and apparatus for classifying seat occupants that can utilize common hardware and software for different seat sensor configurations. The method and apparatus should also work with symmetrical as well as non-symmetrical seat configurations in addition to overcoming the above referenced deficiencies with prior art systems.

SUMMARY OF THE INVENTION

The subject invention includes a method and apparatus for classifying vehicle occupants utilizing common hardware for multiple seat sensor configurations. Multiple seat sensors are mapped into a virtual matrix from which an occupant classification is determined.

The seat sensors are preferably mounted within a seat bottom cushion or the seat structure. The sensors can be mounted in a symmetrical or non-symmetrical pattern. The virtual matrix defines an optimal pattern having an optimal number of seat sensor positions.

In a disclosed embodiment of this invention, the sensors are mounted in a first configuration having one physical sensor for each virtual seat sensor position of the optimal pattern. One occupant weight signal from each sensor is mapped into one corresponding seat sensor position in the optimal pattern. Typically, there are more virtual seat sensors positions in the virtual matrix than there are physical seat sensors mounted within the seat. The difference between the number of virtual cell locations in the virtual matrix and the number of physical sensors mounted within the seat bottom define a remaining number of virtual cell positions. A value is assigned to each of the remaining virtual cell positions based on data from the surrounding physical sensors.

In a preferred embodiment, electrically erasable programmable read only memory (EEPROM) is used to map the virtual matrix by determining values for each of the remaining number of virtual cell positions. The EEPROM is preferably mounted on a printed circuit board that is common to all seat sensor configurations.

The subject invention provides a method and apparatus for classifying seat occupants that can be used for symmetrical and non-symmetrical sensor configurations and utilizes common hardware for each different seat sensor configurations. These and other features of the present invention can be best understood from the following specification and drawings, the following of which is a brief description.

BRIEF DESCRIPTION OF THE DRAWINGS

FIG. 3A is a schematic view of an alternate embodiment of a seat sensor mounting configuration incorporating the subject invention.

FIG. 3B is a schematic view of the sensor configuration of FIG. 3A incorporating a virtual matrix.

FIG. 4 is a schematic view of the control system incorporating the subject invention.

DETAILED DESCRIPTION OF AN EXEMPLARY EMBODIMENT

Figure 1:
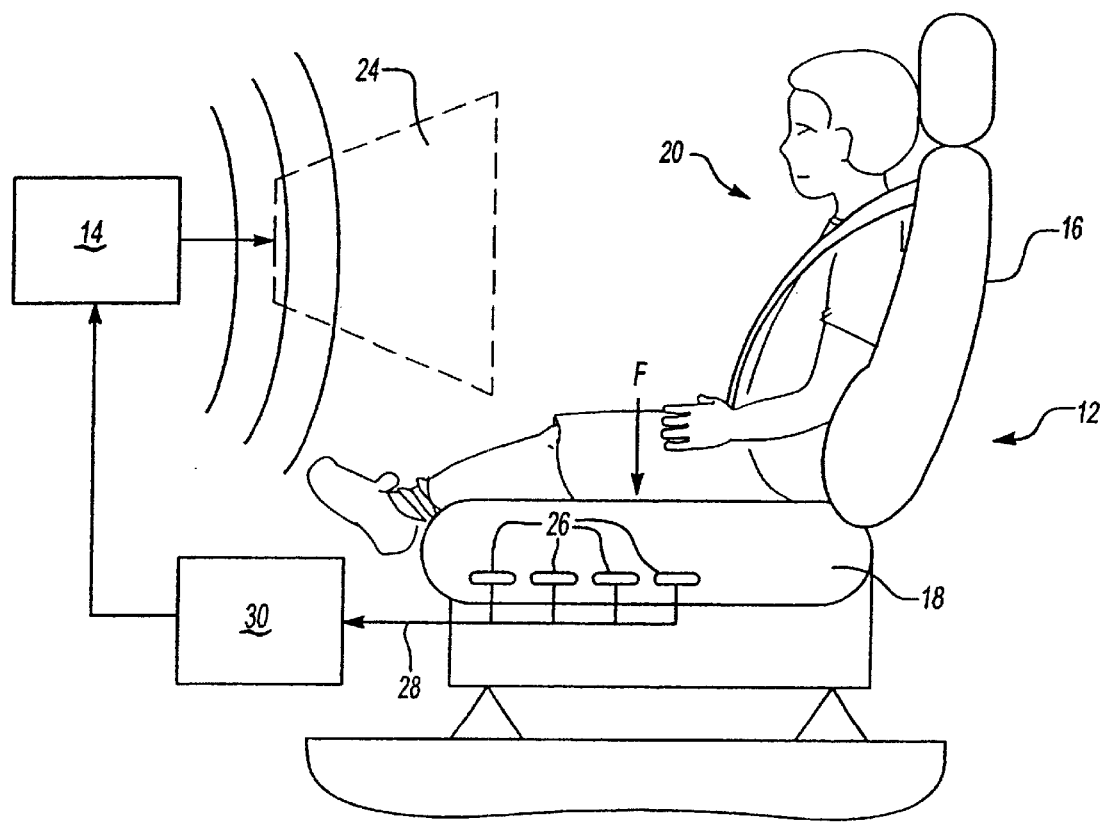
FIG. 1 is a schematic representation of a vehicle seat and airbag system incorporating the subject invention.

A vehicle includes a vehicle seat assembly, shown generally at 12 in FIG. 1, and a restraint system including an airbag 14. The seat assembly 12 is preferably a passenger seat and includes a seat back 16 and a seat bottom 18. A vehicle occupant 20 exerts a force F against the seat bottom 18. The vehicle occupant 20 can be an adult, child, or infant in a car seat.

The airbag system 14 deploys an airbag 24 under certain collision conditions. The deployment force for the airbag 24, shown as deployed in dashed lines in FIG. 1, varies depending upon the type of occupant that is seated on the seat 12. For and adult, the airbag 24 is deployed in a normal manner shown in FIG. 1. If there is child or an infant in a car seat secured to the vehicle seat 12 then the airbag 24 should not be deployed or should be deployed at a significantly lower deployment force. Thus, it is important to be able to classify seat occupants in order to control the various restraint systems.

One way to classify occupants is to monitor and measure the weight force F exerted on the seat bottom 18. Multiple seat sensors 26 are mounted within the seat bottom 18 for generating occupant weight signals 28 representing portions of the occupant weight exerted against each respective sensor 26. The signals 28 are transmitted to a central control unit 30 and the combined output from the sensors 26 is used to determine seat occupant weight. This process will be discussed in greater detail below.

Once seat occupant weight is determined, the occupant is classified into one of any of the various predetermined occupant classes, e.g., adult, child, infant, etc. The classification information can be used in a variety of ways. For example, the classification information can be used in a vehicle restraint system including an airbag system 14. The classification information can be transmitted to an airbag control. If the classification indicates that an adult is in the seat 12 then the airbag 24 is deployed in a normal manner. If the classification indicates that a child or infant is the seat occupant then the airbag 24 will not be deployed or will be deployed at a significantly lower deployment force.

Figure 2:
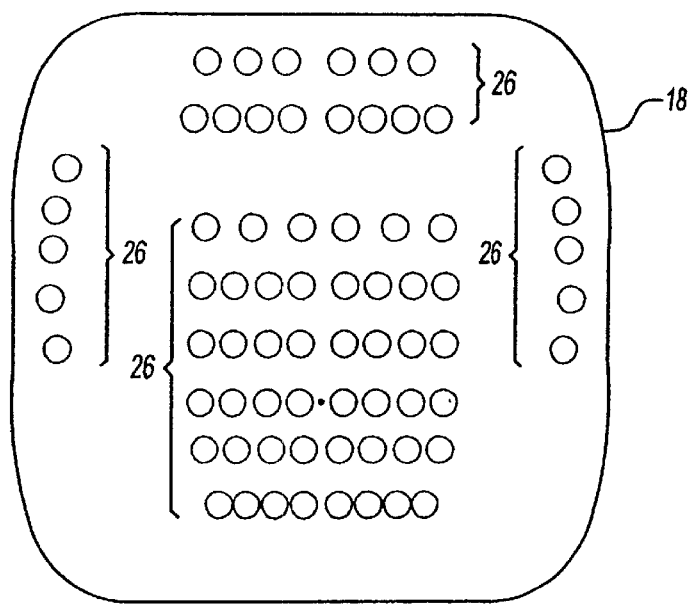
FIG. 2 is a schematic view of one seat sensor mounting configuration incorporating the subject invention.

The seat sensors 26 can be mounted within the seat bottom 18 in any of various configurations. The sensors 26 can be mounted in a symmetrical configuration, see FIG. 2, or a non-symmetrical pattern, see FIG. 4. As shown in FIG. 2, the sensors 26 are preferably mounted into the seat bottom 18 in a series of rows and columns. The number of rows and columns can vary, however, FIG. 2 is exemplary of a fully equipped sensor configuration.

FIG. 3A depicts an alternate sensor mounting configuration. This embodiment has one less row, indicated at 30, than the configuration shown in FIG. 2. Reconfiguring the number of rows and/or columns is typically in response to customer requirements for a seat that includes an extra trench to define seat cushion sections. Or, for smaller seats, it may also be necessary to reduce the number of rows and columns.

In order to utilize common hardware and software with different seat sensor configurations, a virtual matrix 40 is used to take the place of the missing row as shown in FIG. 3B. The virtual matrix 40 includes virtual cell locations 42 to accommodate the sensors 26 that have been removed from an ideal pattern. The virtual cells 42 are assigned values based on data from the surrounding physical sensors 26. The central control unit 30 can then utilize an algorithm that is common to all seat sensor configurations to determine the seat occupant weight. The occupant can then be classified and the airbag system 14 can control the airbag deployment force based on this classification.

As discussed above, the weight signals 28 from the physical sensors 26 are transmitted to a central control unit 30. As shown in FIG. 4, the central control unit 30 is preferably a printed circuit board (PCB) 44 that includes a connector 46 with a plurality of ports for connection to the various sensors 26. The PCB 44 includes a central processor unit (CPU) 48 and electrically erasable programmable read-only memory (EEPROM) 50. EEPROM is a type of programmable read-only memory that can be erased by exposing it to an electrical charge and retains its contents even when the power is turned off. The CPU 48 and EEPROM 50 receive the weight signals 28, generate the virtual matrix 40, and map the signals 28 into the matrix 40. The CPU 48 then generates an output signal 52 to the airbag assembly 14 to control airbag deployment based on the seat occupant weight. The operation of PCBs and EEPROMs are well known and will not be discussed in further detail. Also, while PCBs and EEPROMs are preferred, other similar components known in the art can also be used.

The system operates in the following manner. The sensors 26 are mounted within the seat bottom 18 and generate a plurality of weight signals 28 in response to a weight force F applied to the seat bottom 18. The signals 28 are transmitted to the central control unit 30 where they are mapped into virtual cells 42 in the virtual matrix 40. The output from the virtual cells 42 in the matrix 40 is combined and used to generate an output signal representing the seat occupant weight. Each seat occupant can then be classified into one of a plurality of predetermined occupant weight classes. The classification information can then be used to control any of various restraint systems.

Preferably, the virtual matrix 40 is configured to define an optimal pattern having an optimal number of virtual cells representing the optimal or maximum number of seat sensor positions. The virtual matrix 40 can be generated as a full matrix having a maximum number of seat sensor positions where each physical sensor 26 is mapped into a virtual cell or the matrix 40 can be generated to represent the "missing" physical sensors 26 that the control unit 30 expects to receive signals from. In this second embodiment, shown in FIGS. 3A and 3B, the weight signals 28 from the physical sensors 28 are combined with the data generated for the virtual row 30 to determine the seat occupant weight.

In the preferred embodiment, each sensor signal 28 is mapped into the virtual matrix 40 as shown in FIG. 4. As discussed above, the physical seat sensors 26 can be mounted within the seat bottom 18 in any of various configurations including a symmetrical row/column configuration or a non-symmetrical pattern. For example, in one configuration the sensors 26 can be installed within the seat bottom 18 in a pattern that includes one physical sensor 26 for each virtual seat sensor position or cell 42 of the optimal pattern. The control unit 30 would then map one occupant weight signal 28 from each physical sensor into one virtual seat sensor cell 42 in the optimal pattern.

In the alternative, the physical sensors 26 can be installed in the seat bottom 18 in an alternate pattern that has fewer physical sensors 26 than virtual seat sensor cells in the virtual matrix 40. One occupant weight signal 28 from each of the physical sensors 26 is mapped into a corresponding virtual seat sensor cell 42 in the optimal pattern to define a remaining number of virtual sensor positions. A value for each of the remaining virtual sensor positions is determined based on information supplied by surrounding sensors 26.

Thus, any number of physical sensors 26 can be mounted within a seat in any type of pattern. The weight signals 28 generated by the sensors 26 are then mapped into the virtual matrix 40 and any remaining virtual cells 42 are assigned values based on information from surrounding sensors. Preferably, electrically erasable programmable read only memory EEPROM is to map the virtual matrix 40 by determining values for each of the remaining number of virtual cells 42 with information from the surrounding cells. Optionally, position tables can be stored within the EEPROM to be used in conjunction with occupant weight signals 28 from surrounding sensors 26 to determine values for each of the remaining number of virtual cells 42.

This unique process allows common hardware and software to be used for any seat sensor configuration, which significantly reduces system cost. This means that the same PCB 44 with the same CPU 48 and EEPROM 50 can be used for each different seat sensor configuration. The subject invention also provides a method and apparatus for classifying seat occupants that can be used for symmetrical and non-symmetrical sensor configurations.

Although a preferred embodiment of this invention has been disclosed, it should be understood that a worker of ordinary skill in the art would recognize many modifications come within the scope of this invention. For that reason, the following claims should be studied to determine the true scope and content of this invention.

I claim:

1. A method for measuring weight supported by a vehicle seat comprising the steps of:
    (a) positioning each of a plurality of sensors at a discrete seat sensor location;
    (b) generating a weight signal from each sensor in response to a weight force applied to the seat structure;
    (c) creating at least one virtual sensor cell that is representative of a virtual seat sensor position that is different than each of the discrete seat sensor locations; and
    (d) assigning a weight value to the virtual sensor cell based on weight signal data from discrete seat sensor locations that generally surround the virtual sensor cell.

2. A method according to claim 1 including the step of (e) determining weight on the seat structure based on a combination of the weight signals and weight value of the virtual sensor cell.

3. A method according to claim 1 wherein at least one virtual sensor cell comprises a plurality of virtual sensor cells and step (c) includes assigning each virtual sensor cell to a discrete virtual seat sensor position that is different than each of the discrete seat sensor locations.

4. A method according to claim 3 wherein step (d) includes assigning a weight value to each virtual sensor cell based on weight signal data from discrete seat sensor locations that generally surround the discrete virtual seat sensor position of the respective virtual sensor cell.

5. A method according to claim 1 wherein the virtual seat sensor position corresponds to a seat location [in which it is not possible to] incapable of supporting a mount for a sensor.

6. A method according to claim 1 wherein step (a) includes mounting the sensors in a predetermined sensor configuration.

7. A method according to claim 6 including the step of mapping each of the weight signals into a virtual matrix defining a theoretical sensor configuration, and determining weight on the seat structure based on output from the virtual matrix.

8. A method according to claim 7 wherein the theoretical sensor configuration comprises a plurality of theoretical sensor positions that does not include the virtual seat sensor position of the visual sensor cell.

9. A method according to claim 8 wherein step (c) includes mapping each one of the weight signals into a theoretical sensor position that corresponds generally to a location of the discrete sensor location from which the weight signal is generated.

10. A method according to claim 9 wherein the virtual matrix includes a greater number of theoretical sensor positions than discrete sensor locations and step (c) includes determining which theoretical sensor positions do not have corresponding mapped weight signals and assigning a value for each of the remaining theoretical sensor positions based on weight signal data from discrete sensor locations surrounding each of the remaining theoretical sensor positions.

11. A method according to claim 10 including the step of determining weight on the seat structure based on a combination of the weight value of the virtual sensor cell and the virtual matrix.

12. A method according to claim 7 wherein the theoretical sensor configuration comprises a plurality of theoretical sensor positions one of which corresponds to each of the virtual seat sensor positions of the virtual sensor cells.

13. A method according to claim 12 wherein step (c) includes mapping each one of the weight signals into a theoretical sensor position that corresponds generally to a location of the discrete sensor location from which the weight signal is generated and mapping the weight value of each virtual sensor cell into a corresponding theoretical sensor position in the virtual matrix.

14. A method according to claim 13 wherein the virtual matrix includes a greater number of theoretical sensor positions than discrete sensor locations and virtual seat sensor positions for the virtual sensor cells combined, and step (c) includes determining which theoretical sensor positions do not have corresponding mapped weight signals and assigning a value for each of the remaining theoretical sensor positions based on weight signal data from discrete sensor locations and/or weight values from the virtual sensor cells surrounding each of the remaining theoretical sensor positions.

15. A method according to claim 14 including the step of determining weight on the sear structure based on a combined output from each of the theoretical sensor positions of the virtual matrix.

16. A system for measuring weight supported by a vehicle seat comprising:
    a plurality of sensors supported by a seat structure with each sensor being positioned at a discrete seat sensor location wherein each sensor generates a weight signal in response to a weight force applied to said seat structure; and
    a control unit in communication with said sensors wherein said control unit creates at least one virtual sensor cell that is representative of a virtual seat sensor position that is different than each of said discrete seat sensor locations and assigns a weight value to said virtual sensor cell based on weight signal data from discrete seat sensor locations that generally surround said virtual sensor cell.

17. A system according to claim 16 wherein said control unit determines weight on the seat structure based on a combination of said weight signals and said weight value of said virtual sensor cell.

18. A system according to claim 16 wherein said at least one virtual sensor cell comprises a plurality of virtual sensor cells and wherein said control unit assigns each virtual sensor cell to a discrete virtual seat sensor position that is different than each of said discrete seat sensor locations.

19. A system according to claim 18 wherein said control unit assigns a weight value to each of said virtual sensor cells based on weight signal data from discrete seat sensor locations that generally surround said discrete virtual seat sensor position of said respective virtual sensor cell.

20. A system according to claim 16 wherein said control unit generates a virtual matrix defining a theoretical sensor configuration, maps each of said weight signals into said virtual matrix, and determines weight on the seat structure based on output from said virtual matrix.

21. A system according to claim 20 wherein said theoretical sensor configuration comprises a plurality of theoretical sensor positions that does not include said virtual seat sensor positions of said virtual sensor cells.

22. A system according to claim 21 wherein said control unit maps each one of said weight signals into a theoretical sensor position that corresponds generally to a location of said discrete sensor location from which said respective weight signal is generated and determines weight on said seat structure based on a combination of said weight values of said virtual sensor cells and combined output from each of said theoretical sensor positions of said virtual matrix.

23. A system according to claim 22 wherein said virtual matrix includes a greater number of theoretical sensor positions than discrete sensor locations and wherein said control unit determines which theoretical sensor positions do not have corresponding mapped weight signals and assigns a value for each of the remaining theoretical sensor positions based on weight signal data from discrete sensor locations surrounding each of the remaining theoretical sensor positions.

24. A system according to claim 20 wherein said theoretical sensor configuration comprises a plurality of theoretical sensor positions one of which corresponds to each of said virtual seat sensor positions of said virtual sensor cells.

25. A system according to claim 24 wherein said control unit maps each one of said weight signals into a theoretical sensor position that corresponds generally to a location of said discrete sensor location from which said respective weight signal is generated, maps said weight values of each of said virtual sensor cells into a corresponding theoretical sensor position in said virtual matrix, and determines weight on said seat structure based on combined output from each of said theoretical sensor positions of said virtual matrix.

26. A system according to claim 25 wherein said virtual matrix includes a greater number of theoretical sensor positions than discrete sensor locations and virtual seat sensor positions for said virtual sensor cells combined and wherein said control unit determines which theoretical sensor positions do not have corresponding mapped weight signals and assigns a value for each of the remaining theoretical sensor positions based on weight signal data from discrete sensor locations and/or weight values from said virtual sensor cells surrounding each of the remaining theoretical sensor positions.

* * * * *